United States Patent
White et al.

(10) Patent No.: US 9,991,759 B2
(45) Date of Patent: Jun. 5, 2018

(54) MULTI-DIRECTIONAL AIR COOLING OF A MOTOR USING RADIALLY MOUNTED FAN AND AXIAL/CIRCUMFERENTIAL COOLING FINS

(71) Applicant: HONEYWELL INTERNATIONAL INC., Morristown, NJ (US)

(72) Inventors: Stephen White, Whittier, CA (US); Evgeni Ganev, Torrance, CA (US); Leroy Allen Fizer, Huntington Beach, CA (US); Norman Clampitt, Long Beach, CA (US); Pius Bahn, Rancho Palos Verdes, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 555 days.

(21) Appl. No.: 14/199,186

(22) Filed: Mar. 6, 2014

(65) Prior Publication Data
US 2015/0256045 A1    Sep. 10, 2015

(51) Int. Cl.
| H02K 9/00 | (2006.01) |
| H02K 5/18 | (2006.01) |
| H02K 9/04 | (2006.01) |
| H02K 5/12 | (2006.01) |
| H02K 9/16 | (2006.01) |
| H02K 9/02 | (2006.01) |
| H02K 9/14 | (2006.01) |

(52) U.S. Cl.
CPC .............. *H02K 5/18* (2013.01); *H02K 9/04* (2013.01); *H02K 5/12* (2013.01); *H02K 9/00* (2013.01); *H02K 9/02* (2013.01); *H02K 9/14* (2013.01); *H02K 9/16* (2013.01)

(58) Field of Classification Search
CPC .. H02K 5/18; H02K 5/20; H02K 5/22; H02K 9/00; H02K 9/02; H02K 9/08; H02K 9/14; H02K 5/12; H02K 9/04; H02K 9/16
USPC ................................................ 310/52–59, 89
See application file for complete search history.

(56) References Cited

U.S. PATENT DOCUMENTS

| 4,399,382 A | * | 8/1983 | Volkrodt | ................... | H02K 1/16 310/216.055 |
| 4,406,959 A | * | 9/1983 | Harano | ..................... | H02K 9/20 165/104.25 |
| 5,062,330 A | * | 11/1991 | Trautmann | .............. | B23B 9/005 310/112 |

(Continued)

FOREIGN PATENT DOCUMENTS

| FR | 2838252 A1 | * | 10/2003 | ............... H02K 5/18 |
| GB | 000751083 A | * | 9/1954 | |

(Continued)

OTHER PUBLICATIONS

English Translation of FR 2838252.*
FR 2838252 A1 English Translation.*

*Primary Examiner* — Bernard Rojas
*Assistant Examiner* — Maged Almawri
(74) *Attorney, Agent, or Firm* — Shimokaji IP

(57) ABSTRACT

An airflow system may comprise a fan radially mounted on a motor with a first plurality of fins surrounding the motor disposed to provide airflow in a first direction, and a second plurality of fins surrounding the motor disposed to provide airflow in a second direction. A housing may surround the plurality of fins.

7 Claims, 5 Drawing Sheets

(56) References Cited

U.S. PATENT DOCUMENTS

| | | | | |
|---|---|---|---|---|
| 5,311,090 | A * | 5/1994 | Ferlatte | H02K 5/10 310/88 |
| 5,630,461 | A * | 5/1997 | CoChimin | B22C 9/046 164/34 |
| 5,698,913 | A * | 12/1997 | Yagi | B61C 9/46 105/53 |
| 5,714,816 | A * | 2/1998 | Jensen | H02K 11/33 310/64 |
| 5,747,900 | A * | 5/1998 | Nakamura | H02K 9/14 310/58 |
| 5,998,896 | A * | 12/1999 | Early | H02K 5/20 310/410 |
| 6,093,990 | A * | 7/2000 | Meeks | H02K 5/10 310/59 |
| 6,246,134 | B1 * | 6/2001 | Berrong | H02K 9/18 310/52 |
| 6,522,036 | B1 * | 2/2003 | Chen | H02K 9/18 310/58 |
| 6,703,730 | B2 * | 3/2004 | Hayashi | H02K 5/10 310/59 |
| 6,909,211 | B2 * | 6/2005 | Ciciliani | H02K 5/15 310/216.045 |
| 7,118,355 | B2 * | 10/2006 | Lipa, III | F04D 25/0606 417/370 |
| 7,786,630 | B2 * | 8/2010 | Waddell | H02K 1/325 310/52 |
| 8,167,585 | B2 * | 5/2012 | Kreitzer | H02K 5/10 310/59 |
| 8,597,001 | B2 | 12/2013 | Saari | |
| 8,674,565 | B2 * | 3/2014 | Lang | H02K 9/06 310/52 |
| 8,912,698 | B2 * | 12/2014 | Fleming | H02K 9/06 310/89 |
| 9,331,550 | B2 * | 5/2016 | Ganev | H02K 9/06 |
| D762,574 | S * | 8/2016 | Grillenberger | D13/112 |
| 2006/0055256 | A1 * | 3/2006 | Kreitzer | H02K 9/18 310/59 |
| 2006/0076841 | A1 * | 4/2006 | Kreitzer | H02K 5/20 310/59 |
| 2013/0093272 | A1 * | 4/2013 | Shimono | H02K 9/14 310/64 |

FOREIGN PATENT DOCUMENTS

| | | |
|---|---|---|
| JP | 2000245108 A | 9/2000 |
| JP | 2007116792 A | 5/2007 |
| JP | 2010288392 A | 12/2010 |

* cited by examiner

MULTI-DIRECTIONAL AIR COOLING OF A MOTOR USING RADIALLY MOUNTED FAN AND AXIAL/CIRCUMFERENTIAL COOLING FINS

BACKGROUND OF THE INVENTION

The present invention generally relates to cooling systems, and more particularly, to cooling a motor with a fan.

A fundamental requirement of the cooling of an electric machine may be the required removal of heat so that the temperature distribution resulting from the losses associated with the energy conversion does not result in component temperatures that exceed a component thermal capability. Temperature distribution may vary with the operating conditions of the motor, duty cycle, and environmental conditions including active cooling. Cooling can be addressed with passive and active cooling methods. Passive cooling may include natural convection, radiation, and thermal conduction to a mounting structure. Active cooling may include forced air and forced fluid cooling. Active cooling can be applied to the internal components and external structure of the electric machine.

Installations typical to aerospace and transportation applications may require coordinated packaging and layout of the machine to the space and envelope restrictions of the vehicle. In this architecture, the fan may be shaft mounted. Nonetheless, whether the fan is electrically or mechanically driven, axial space may be consumed by the fan and therefore may not be available for an electric machine. When a fan is radially mounted, cooling fins may still be required to increase the heat transfer surface to air flow and distribute the airflow to the desired locations for a uniform heat removal. Conventional radially mounted fans may cool in one direction. This may result in inefficiencies due to non-uniform cooling of sides of a motor.

As can be seen, there is a need for a multidirectional air cooling of a motor using a radially mounted fan.

SUMMARY

In one aspect of the invention, a system for cooling a motor, comprises a fan radially mounted on a motor; a first plurality of fins surrounding the motor disposed to provide airflow in a first direction; a second plurality of fins surrounding the motor disposed to provide airflow in a second direction; and a housing surrounding the plurality of fins.

In another aspect of the invention, a method of cooling a motor comprises radially mounting a fan on a motor; guiding an air flow around the motor in a first direction using a first plurality of fins; and guiding the air flow around the motor in a second direction orthogonal to the first direction with a second plurality of fins.

In another aspect of the invention, a system for cooling a motor comprises a fan radially mounted on a motor; a first plurality of fins positioned in a first direction surrounding the motor; a second plurality of fins surrounding the motor positioned in a second direction different than the first plurality of fins surrounding the motor, wherein the second plurality of fins are configured as fins of varied length; and a housing surrounding the first plurality of fins and the second plurality of fins.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, an embodiment of the present invention generally provides a system for multi-directional air cooling of a motor.

More specifically, the present invention may provide a system for multi-directional air cooling of a motor using a fan.

Figure 1:
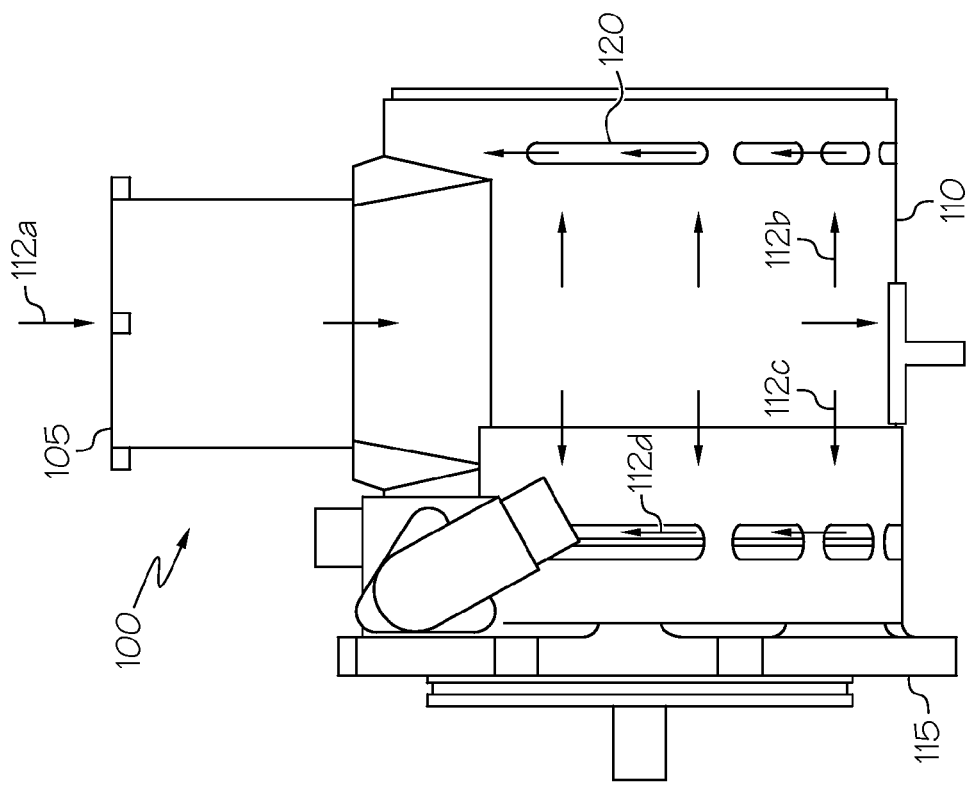
FIG. 1 illustrates a side view of a motor cooling system and an air flow pattern as seen from the side according to an exemplary embodiment of the invention.

Referring to FIG. 1, a motor cooling system 100 may include a fan 105 mounted on a motor 110. The fan 105 may route air around the motor 110 in several directions. The air flow arrows 112a, 112b, 112c, and 112d may indicate the direction taken by the flow of air through the fan 105 and motor 110. A cooling air exit 120 may allow air from inside the motor housing 115 to exit the motor housing 115 after the air has travelled around the motor 110. For example, the fan 105 may be configured to route air in a first air flow 112a in a first direction with respect to the motor housing 115. The fan 105 may be configured to route air in a second air flow 112b in a second direction that may be orthogonal to the first air flow 112a. The fan 105 may be configured to route air as a third air flow 112c in a third direction that may also be orthogonal to the first air flow 112a. The fan 105 may be configured to force air out an air exit 120 in a fourth air flow 112d.

Figure 2:
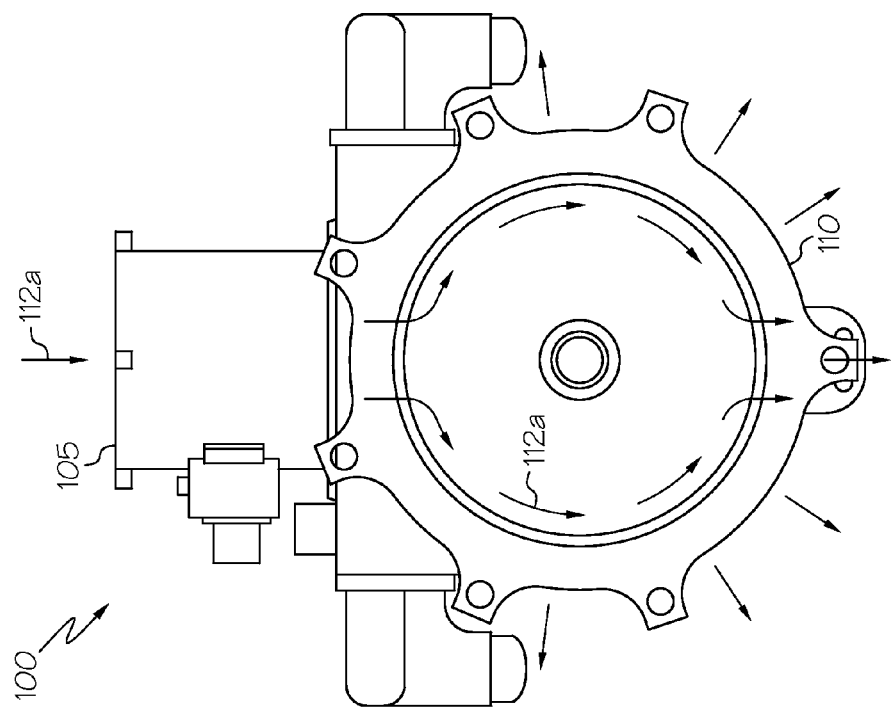
FIG. 2 illustrates a front end view of the motor cooling system of FIG. 1 and a circumferential airflow provided by the cooling system.

Referring to FIG. 2, the fan 105 in the motor cooling system 100 may route the first air flow 112a in a circumferential direction that may be circumferential to the motor 110. The first air flow 112a may split and flow in opposite directions around the circumference of the motor 110 while some of the air may be guided along a length of the motor 110. The force of the air from the fan 105 may force air in both a circumferential direction (as the first air flow 112a) and a lengthwise direction (as the second air flow 112b in FIG. 1), along the motor 110, by the force of the fan 105. Using a radially mounted fan 105 to provide the cooling for a motor may include minimizing resistance to air flowing around the motor 110 to maximize cooling. This may result in uniform flow distribution to ensure full flow coverage over the exterior of the motor 110. The uniform flow distribution may maximize a heat transfer coefficient and surface area so as to provide heat transfer out of the motor 110 using a minimum of air flow and fan 105 power. In an embodiment, the motor cooling system 100 may utilize either radial or axial fan 105 placements, and may utilize a fan 105 of various sizes and power.

Figure 3:
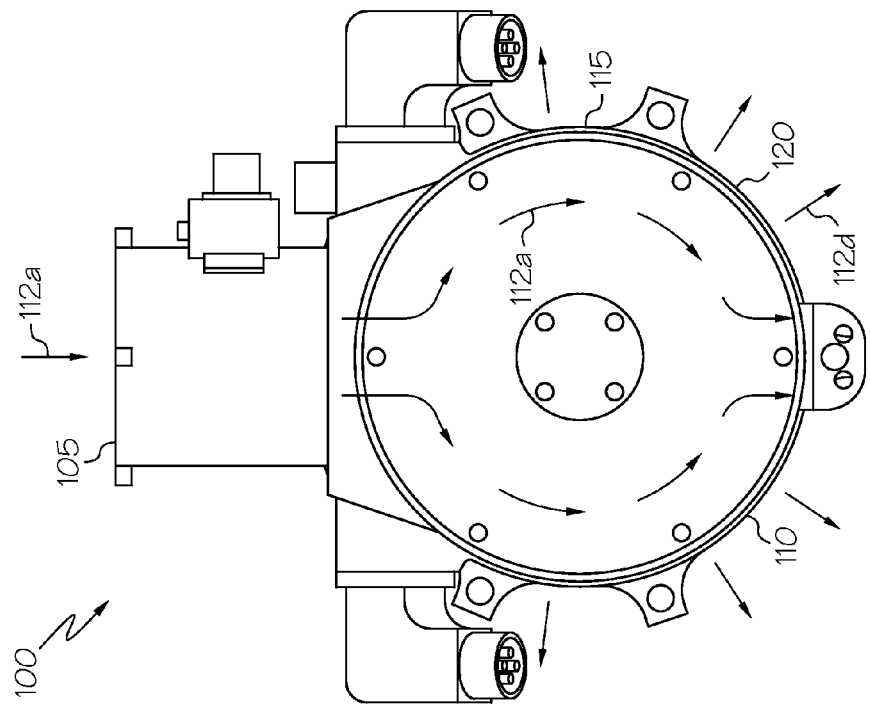
FIG. 3 illustrates a back end view of the cooling system of FIG. 1.

Referring to FIG. 3, the fan 105 in the motor cooling system 100, may route the first air flow 112a on opposite sides of the motor's circumference. FIG. 3 shows an opposite end view of the motor 110 from FIG. 2. As shown in both FIG. 3 and FIG. 1, the fan may route air out of an air exit 120 of the motor housing 115 as the fourth air flow 112d.

Figure 4:
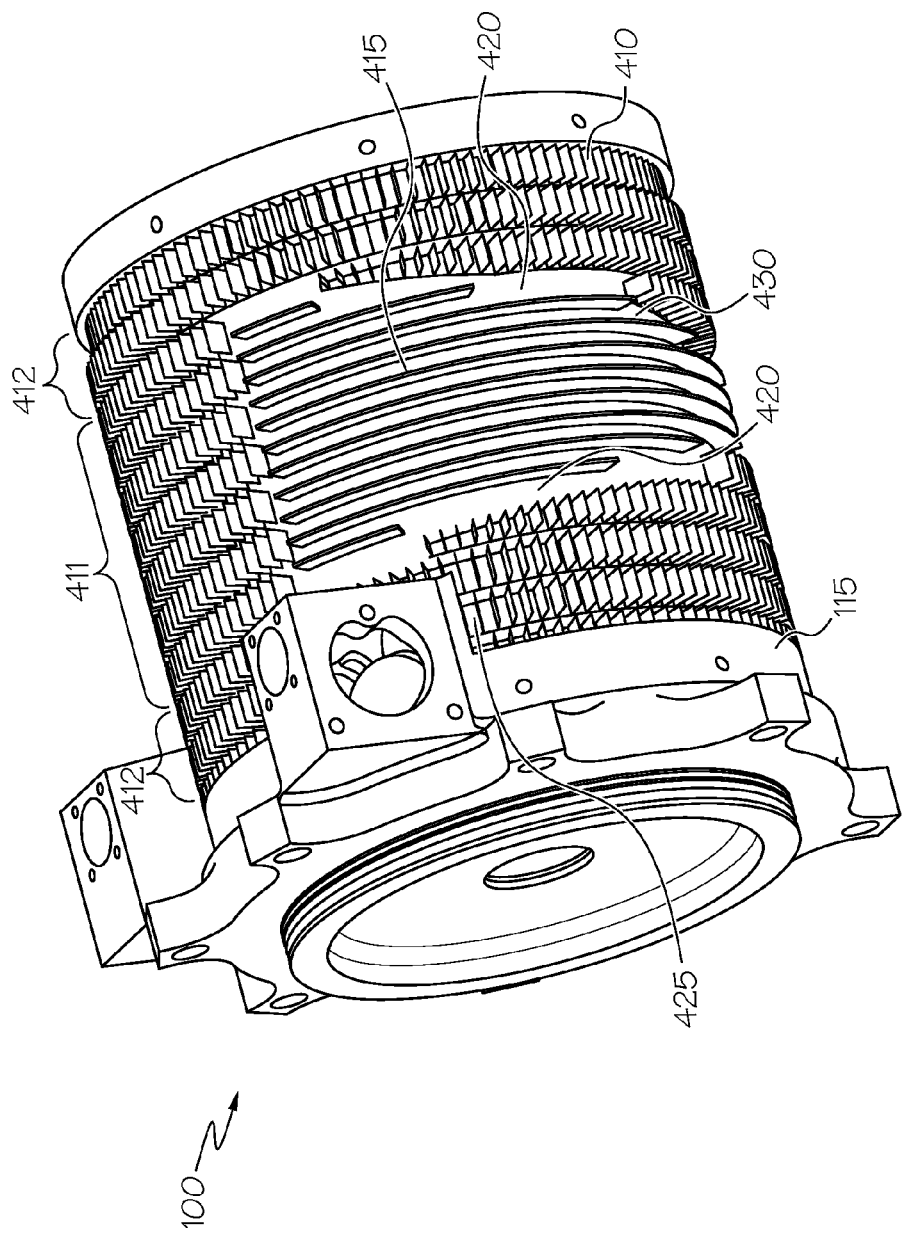
FIG. 4 shows a perspective top view of a cooling fin arrangement around a motor housing of the cooling system of FIG. 1.

Referring to FIG. 4, a first set of fins 410 together with a second set of fins 415 may produce a path for multi-directional flow of air within the motor housing 115. For example, the cooling system 100 may include the fins 410 and 415 positioned to guide airflow in multiple directions. For example, the motor cooling system 100 may include the first set of fins 410 aligned in a first fin direction, for example, an axial direction. The fins 410 may be positioned to either fully surround a circumference of the motor 110 or only partially surround the circumference of the motor 110. As shown in FIG. 4, a first plurality 411 of the fins 410 may partially surround the circumference of the motor 110. A second plurality 412 of the fins 410 may fully surround the circumference of the motor 110. The second set of fins 415 may be positioned in a second fin direction different from the first fin direction. For example, the fins 415 may be oriented in a circumferential direction. In an embodiment, the second set of fins 415 may be on another side of the motor housing 115 that is not visible from the view shown in FIG. 4. In an embodiment, the first fin direction may be orthogonal to the second fin direction. The first set of fins 410 may be positioned in a plurality of rows within the housing 115. In an embodiment, rows of the first set of fins 410 and/or the second set of fins 415 may be of varied length, and also individual ones of the first set of fins 410 and the second set of fins 415 may be of varied length. For example, some of the first set of fins 410 may be longer than other ones of the first set of fins 410, and some of the second set of fins may be longer than other ones of the second set of fins 415.

Use of straight, plain fins as the first set of fins 410 may be adequate for many applications. However, this approach may not be feasible for certain heat loads and the cooling fan 105 (FIG. 1) location encountered in the current application, for at least the following reasons. First, a radially mounted cooling fan 105 (FIG. 1) arrangement may force cooling air to distribute and make a number of turns. This may create a high pressure drop and may reduce air flow. Therefore the first set of fins 410 and the second set of fins 415 may be arranged to allow the air to flow with little resistance, uniformly, and with a sufficient product of heat transfer coefficient and surface area. Second, the requirement specifically to create a sufficiently high heat transfer coefficient, because of the high heat flux in this application, may dictate that a cooling fin shape be more aggressive than a plain shape. The second set of fins 415 may use, for example, offset fins (700, FIG. 7) for this purpose. Offset fins may provide sufficiently high heat transfer coefficients but at a cost that may include high resistance to air flow. Therefore this approach to motor cooling may use both the first set of fins 410 and the second set of fins 415, located so as to allow a uniform flow of a large amount of air, while generating sufficiently high heat transfer over the motor 110.

A radially mounted cooling fan 105 arrangement may require that the air flow make multiple turns in order to provide uniform coverage of the motor housing 115. The air may be routed by the fins 410, 415 and split by the fins 410, 415 into both axial and circumferential directions as the air hits the motor 110 from the fan 105.

As the air exits the fan 105, it may immediately impinge on the motor housing 115. The fan 105 may be mounted very close to the motor housing 115 due to space constraints, so there may be very little room for the air to slow down and turn to flow around the housing 115. This may be addressed in the following ways. First, the housing 115 at the fan exit 120 (FIG. 1) may be spaced with respect to the fan 105 to allow the most amount of pressure on a largest area of the housing 115. Second, the fan 105 may include a tapered inlet shaft (520, FIG. 5), so that the air may approach the motor housing 115 surface as tangentially as possible. This tapering may allow a cooling fan exit plenum (exit chamber) (FIG. 5, 530) to enclose a significant fraction of the motor housing 115 circumference before the air flow is forced to flow only through a more limited area of the circumferential cooling passages themselves. Third, the first set of fins 410 that are meant to block air from the circumferential direction around the housing 115 may be plain rectangular, which may provide little resistance to air flow while still providing extended surface area for effective heat transfer. Less aggressive, plain fins (600, FIG. 6) may be used at an area where heat transfer coefficient is enhanced due to an impacting air flow out of the fan 105 against the housing 115, for example, an area of the housing 115 adjacent to the fan 105.

As the air flows around the motor housing 115 through the first set of fins 410, the air may turn and flow fore and aft through the second set of fins 415. These second set of fins 415 may provide a significant cooling effect for the motor 110. This air flow turning out of the first set of fins 410 may need to be distributed as uniformly as possible so that the entire motor housing 115 is cooled as effectively as possible. The cooling system 100 may include a transition area 420 between the first set of fins 410 and the second set of fins 415 in which air flowing through channels 425 in the first set of fins may change direction and flow through channels 430 in the second set of fins. Uniform air flow distribution may be achieved in the following ways. First, the flow area devoted to the first set of fins 410 may be reduced on the way around the motor housing 115, so that at an opposite side of the housing 115 there is essentially no plain fin passage available. This continuous loss of flow area in the first set of fins 410 may force the air to the second set of fins 415. Second, the resistance to air flow may be greater in the second set of fins 415 than in the first set of fins 410. This greater flow resistance in the second set of fins 415 may have the effect of causing the air to spread out and exit uniformly from the first set of fins 410 into the second set of fins 415.

Figure 5:
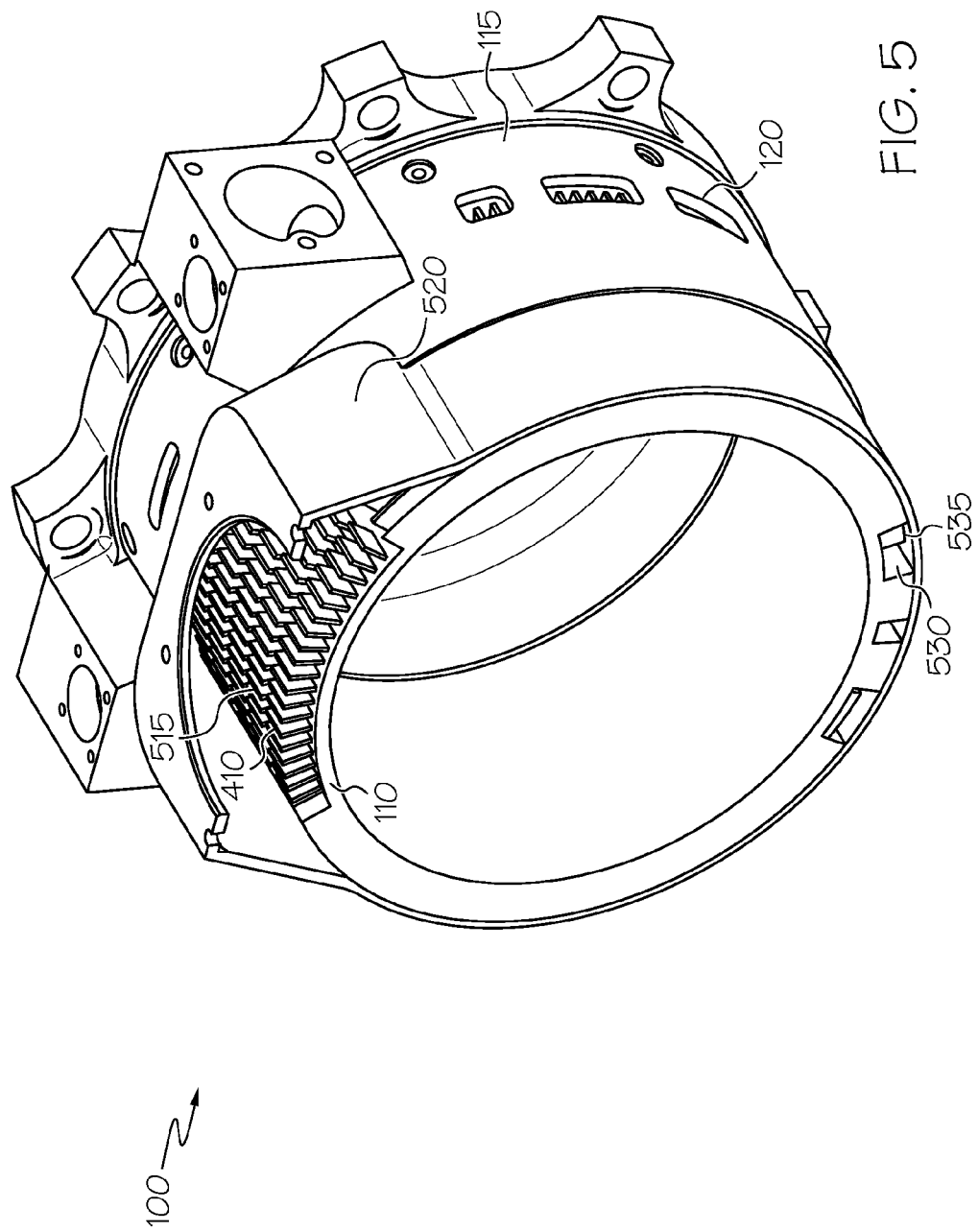
FIG. 5 shows a perspective end view of the motor of FIG. 5 surrounded by a housing.

Referring to FIG. 5, the motor cooling system 100 may include the first set of fins 410, the outer housing 115, and a cooling air inlet plenum (chamber) 515. In an embodiment, a tapered air inlet shaft 520 may receive air into the motor cooling system 100. The first set of fins 410 may rotate around the motor 110. Outlet ports 120 radially oriented with respect to the motor 110 and outlet ports 535 axially oriented with respect to the motor 110 may allow air to escape from the housing 115.

Figure 6:
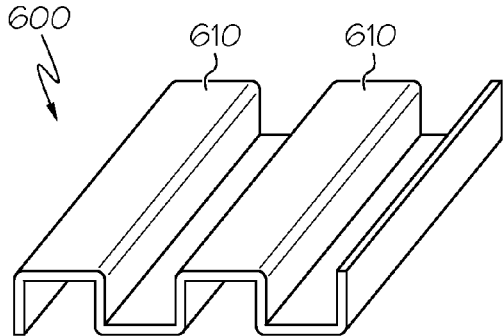
FIG. 6 shows a perspective end view of a plain fin arrangement.

Referring to FIG. 6, the motor cooling system 100 of FIG. 1 in an embodiment may utilize plain fins 600. In an embodiment, the plain fin arrangement 600 may include fins 610 that are evenly spaced between one another.

Figure 7:
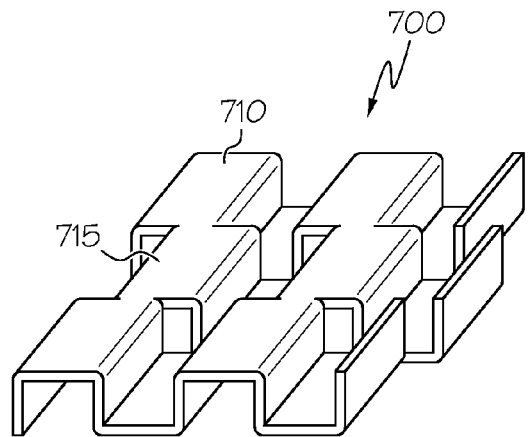
FIG. 7 shows a perspective end view of an offset fin arrangement.

Referring to FIG. 7, the motor cooling system 100 of FIG. 1 in an embodiment may utilize offset fins 700. The offset fin arrangement may include a plurality of protrusions 710, 715 configured in an uneven manner on the cooling fan system 100, such that the first protrusion 710 is not evenly aligned with a second protrusion 715. The protrusions 710 may cause air turbulence and may force air in a multi-directional manner, thereby forcing air to various parts of the motor housing 115 (FIG. 1).

Figure 8:
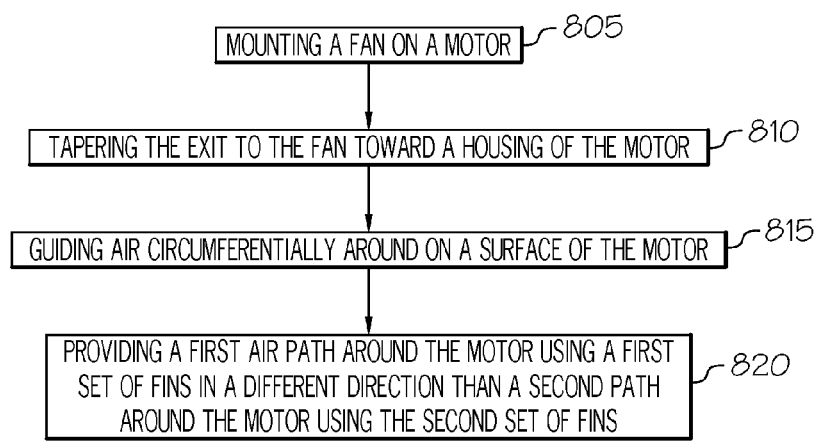
FIG. 8 illustrates a method of cooling a motor according to an exemplary embodiment of the present invention.

FIG. 8 illustrates a method of implementing the radially mounted cooling fan system 100 of FIG. 1. A step 805 may include mounting a fan on a motor. A step 810 may include tapering the exit to the fan toward a housing of the motor. (See 520, FIG. 5, which shows an exemplary tapering). A step 815 may include guiding air circumferentially around on a surface of the motor. A step 820 may include providing a first air path around a motor using a first set of fins (410, FIG. 4) in a different direction, such as orthogonal, than a second path around the motor using a second set of fins (415, FIG. 4).

It should be understood, of course, that the foregoing relates to exemplary embodiments of the invention and that modifications may be made without departing from the spirit and scope of the invention as set forth in the following claims.

We claim:

1. A system for cooling a motor, comprising:
a fan radially mounted on a motor to route an inlet airflow radially towards an axis of rotation of the motor;
a plurality of axially oriented fins surrounding the motor and disposed to guide a first portion of the inlet airflow in a first axial direction and to guide a second portion of the inlet airflow in a second axial direction, wherein the first axial direction is opposite to the second axial direction;
wherein the axially oriented fins are disposed in a plurality of groups of circumferential rows, wherein:
a first group of circumferential rows includes only first axially oriented fins;
a second group of circumferential rows includes second axially oriented fins and circumferentially oriented fins;
a third group of circumferential rows includes only third axially oriented fins;
wherein, in an axial direction, the second group of circumferential rows is disposed between the first and third groups of circumferential rows;
a plurality of circumferentially oriented fins surrounding the motor and disposed to guide a third portion of the inlet airflow in a circumferential direction;
a housing surrounding the axially oriented fins and the circumferentially oriented fins; and
a plurality of air exit ports in the housing, wherein the air exit ports are spaced over a majority of a circumference of the housing and guide inlet airflow radially away from and around a majority of the axis of rotation, and thereby out of the housing.

2. The system of claim 1, wherein the plurality of axially oriented fins are configured as plain fins, and the plurality of circumferentially oriented fins are configured as offset fins, wherein the offset fins are configured with a plurality of protrusions in an uneven manner.

3. The system of claim 1, including a second set of exit ports facing axially from the surface of the motor, wherein the second set of exit ports are configured to output air from the fan.

4. A method of cooling a motor comprising:
guiding a first portion of air flow axially along the motor using a plurality of axially oriented fins, wherein the axially oriented fins are disposed in a plurality of groups of circumferential rows, wherein:
a first group of circumferential rows includes only first axially oriented fins;
a second group of circumferential rows includes second axially oriented fins and circumferentially oriented fins;
a third group of circumferential rows includes only third axially oriented fins,
wherein, in an axial direction, the second group of circumferential rows is disposed between the first and third groups of circumferential rows;
guiding a second portion of the air flow around a circumference of the motor with the circumferentially oriented fins; and
guiding a third portion of the air flow radially away from and around a majority of an axis of rotation of the motor.

5. The method of claim 4, including:
directing air through an outlet port in a housing of the motor in an axial direction with respect to a rotation of the motor.

6. The method of claim 5, including:
directing air through an outlet port in the housing of the motor in a radial direction with respect to a rotation of the motor.

7. A system for cooling a motor comprising:
a fan radially mounted on a motor;
a tapered air inlet shaft interposed between the fan and the motor;
a plurality of axially oriented fins surrounding the motor and positioned at the tapered air inlet shaft;
a plurality of circumferentially oriented fins surrounding the motor;
a housing surrounding the axially oriented fins and the circumferentially oriented fins; and
wherein the tapered air inlet shaft initially receives an inlet air radially towards only axially oriented fins and directs the inlet air tangentially to the circumferentially oriented fins and a surface of the housing.

* * * * *